(12) United States Patent
Gibson et al.

(10) Patent No.: US 10,445,704 B2
(45) Date of Patent: Oct. 15, 2019

(54) OBJECT IDENTIFICATION AND SENSING

(71) Applicant: ENT SERVICES DEVELOPMENT CORPORATION LP, Houston, TX (US)

(72) Inventors: Jonathan D. Gibson, Austin, TX (US); Joseph Miller, Herndon, VA (US); Scott A. Gaydos, Emmaus, PA (US); Clifford A. Wilke, Herndon, VA (US)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 0 days.

(21) Appl. No.: 15/305,601

(22) PCT Filed: Jul. 31, 2014

(86) PCT No.: PCT/US2014/049131
§ 371 (c)(1),
(2) Date: Oct. 20, 2016

(87) PCT Pub. No.: WO2016/018364
PCT Pub. Date: Feb. 4, 2016

(65) Prior Publication Data
US 2017/0140339 A1   May 18, 2017

(51) Int. Cl.
*G06Q 10/10* (2012.01)
*G06Q 10/06* (2012.01)
(Continued)

(52) U.S. Cl.
CPC ......... *G06Q 10/1093* (2013.01); *G01C 21/00* (2013.01); *G06Q 10/0631* (2013.01); *G06Q 10/087* (2013.01); *G06Q 10/10* (2013.01)

(58) Field of Classification Search
CPC ............................ G06Q 10/1093; G01C 21/00
(Continued)

(56) References Cited

U.S. PATENT DOCUMENTS 6,957,775 B2 * 10/2005 Tsikos ................ G06K 7/10722
235/462.01
7,260,553 B2    8/2007 Ebert
(Continued)

FOREIGN PATENT DOCUMENTS

KR        20070001435        1/2007
WO        WO-2012073250      6/2012

OTHER PUBLICATIONS

Gibson, et al., "Making My Life Easier Through Context-Awareness", 10 pages, Apr. 29, 2014.
(Continued)

*Primary Examiner* — Krishnan Ramesh
(74) *Attorney, Agent, or Firm* — Sheppard Mullin Richter & Hampton LLP

(57) ABSTRACT

An example system can receive information regarding an object, and provide navigation to the object. The object can be identified based on the received information. Information regarding an operating parameter about the object can be received, and whether the operating parameter of the object is within a predefined operating range based on the identity of the object and the received operating parameter information can be determined and communicated.

15 Claims, 6 Drawing Sheets

(51) Int. Cl.
*G06Q 10/08* (2012.01)
*G01C 21/00* (2006.01)

(58) Field of Classification Search
USPC .......................................................... 701/408
See application file for complete search history.

(56) References Cited

U.S. PATENT DOCUMENTS

| | | | |
|---|---|---|---|
| 7,725,532 B2 | 5/2010 | Jeon et al. | |
| 8,050,939 B2 | 11/2011 | Graves et al. | |
| 8,521,680 B2 | 8/2013 | Lin | |
| 8,587,402 B2 | 11/2013 | O'Shaughnessy et al. | |
| 8,631,420 B2 | 1/2014 | Han et al. | |
| 9,867,014 B2 * | 1/2018 | Coughlin | G01C 21/20 |
| 2003/0071122 A1 * | 4/2003 | Tsikos | G02B 26/10 |
| | | | 235/454 |
| 2005/0171738 A1 * | 8/2005 | Kadaba | G06K 19/0717 |
| | | | 702/187 |
| 2006/0273167 A1 * | 12/2006 | Baldassari | B07C 3/10 |
| | | | 235/385 |
| 2008/0143482 A1 * | 6/2008 | Shoarinejad | G01S 7/003 |
| | | | 340/10.1 |
| 2008/0285091 A1 * | 11/2008 | Skaaksrud | G06Q 10/08 |
| | | | 358/473 |
| 2009/0261978 A1 | 10/2009 | Lee et al. | |
| 2011/0130958 A1 * | 6/2011 | Stahl | G01C 21/362 |
| | | | 701/533 |
| 2012/0324434 A1 | 12/2012 | Tewari et al. | |
| 2013/0045685 A1 | 2/2013 | Kiani et al. | |
| 2013/0226878 A1 | 8/2013 | Sankaranarayanan et al. | |
| 2013/0275894 A1 | 10/2013 | Bell et al. | |
| 2013/0325616 A1 | 12/2013 | Ramde et al. | |
| 2014/0087769 A1 | 3/2014 | Nath et al. | |
| 2014/0278099 A1 * | 9/2014 | Schenken | G06Q 10/02 |
| | | | 701/533 |
| 2015/0154552 A1 * | 6/2015 | Skaaksrud | H04W 12/06 |
| | | | 705/333 |

OTHER PUBLICATIONS

PCT Search Report/Written Opinion ~ Application No. PCT/US2014/049131 dated Mar. 31, 2015 ~ 14 pages.

Saeedi, et al., "Context-aware Personal Navigation Using Embedded Sensor Fusion in Smartphones", Published Mar. 25, 2014, 17 pages. www.ncbi.nlm.nih.gov/pmc/articles/PMC4029676/.

* cited by examiner

OBJECT IDENTIFICATION AND SENSING

CLAIM FOR PRIORITY

The present application is a national stage filing under 35 U.S.C. § 371 of PCT application number PCT/US2014/049131, having an international filing date of Jul. 31, 2014, the disclosure of which is hereby incorporated by reference in its entirety.

BACKGROUND

In many arenas, disparate tools can be used to achieve desired goals. Often, the disparate nature of such tools creates inefficiencies. Nevertheless, use of disparate tools often occurs due to changing desires and changing conditions.

DETAILED DESCRIPTION

Figure 1:
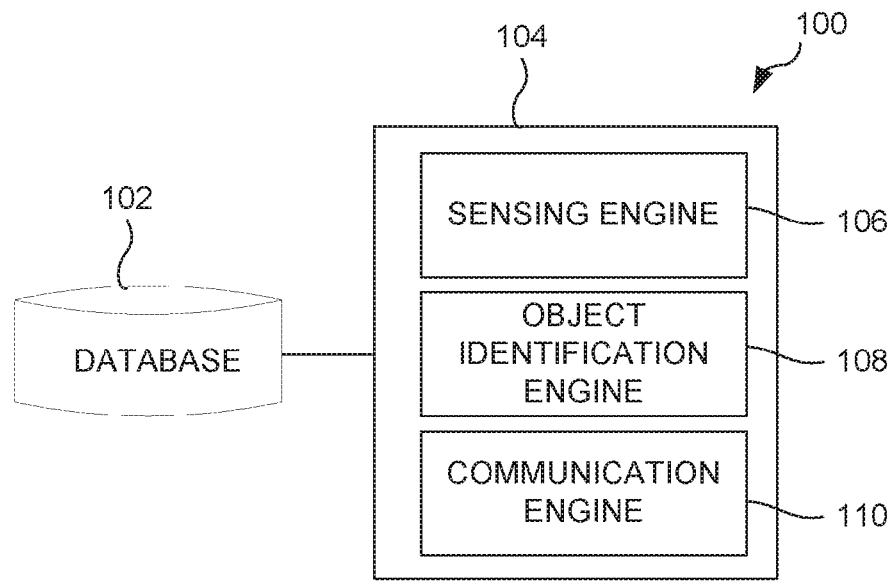
FIG. 1 illustrates an example of a system according to the present disclosure.

As technology becomes increasingly prevalent, it can be helpful to leverage technology to integrate multiple devices, in real-time, in a seamless environment that brings context to information from varied sources without requiring explicit input. Various examples described below provide for context-aware platform (CAP) object identification and sensing, which can allow for seamlessly providing contextual information to a user. The user can be a person, an organization, or a machine, such as a robot. For example, for an individual with a particular occupation, the example CAP object identification and sensing experience may provide contextual information seamlessly through integration of the user's task list, calendar, location, and other resources, as well as various services, such as turn-by-turn navigation. Some examples of the present disclosure can allow for a continual seamless integrated CAP object identification and sensing experience. As used herein, "CAP experience" and "experience" are intended to mean the interpretation of multiple elements of context in the right order and in real-time to provide information to a user in a seamless, integrated, and holistic fashion. In some examples, an experience or CAP experience can be provided by executing instructions on a processing resource. Further, an "object" can include anything that is visible or tangible, for example, a machine, a device, and/or a substance.

The CAP experience is created through the interpretation of one or more packages. Packages can be atomic components that use functions related to devices or integrations to other systems. As used herein, "package" is intended to mean components that capture individual elements of context in a given situation. In some examples, the execution of packages provides an experience. For example, a package could provide a schedule or a navigation component, and an experience could be provided by executing a schedule package to determine a user's schedule, and subsequently executing a navigation package to guide a user to the location of an event or task on the user's schedule.

In some examples, the platform includes one or more experiences, each of which correspond to a particular application, such as a user's occupation or a robot's purpose. In addition, the example platform may include a plurality of packages which are accessed by the various experiences. The packages may, in turn, access various information from a user or other resources and may call various services, as described in greater detail below. As a result, the user can be provided with contextual information seamlessly with little or no input from the user. The CAP is an integrated ecosystem that can bring context to information automatically and "in the moment." For example, CAP can sense, retrieve, and provide information from a plurality of disparate sensors, devices, and/or technologies, in context, and without input from a user.

The figures herein follow a numbering convention in which the first digit corresponds to the drawing figure number and the remaining digits identify an element or component in the drawing. For example, reference numeral 102 may refer to element "02" in FIG. 1 and an analogous element can be identified by reference numeral 202 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

FIG. 1 illustrates an example of a system according to the present disclosure. As shown in the example of FIG. 1, the CAP system 100 can include a database 102 accessible by and in communication with a plurality of engines, for example, CAP object identification and sensing engines 104. The CAP object identification and sensing engines 104 can include a sensing engine 106, an object identification engine 108, and a communication engine 110. The CAP system 100 can include hardware, for example, in the form of transistor logic and/or application specific integrated circuitry (ASICs), firmware, and software, for example, in the form of machine readable and executable instructions (program instructions (programming) stored in a machine readable medium (MRM)) which in cooperation can form a computing device as discussed in connection with FIG. 2.

The plurality of engines can include a combination of hardware and software (e.g., program instructions), but at least includes hardware that is configured to perform particular functions, tasks and/or actions. The engines shown in FIG. 1 are used to facilitate a CAP object identification and sensing experience.

The sensing engine 106 can include hardware and/or a combination of hardware and program instructions to sense parameters of an object such as a machine. For example, the sensing engine 106 can include hardware and/or a combination of hardware and program instructions to provide navigation to an object, request information to be sensed, and receive sensed information regarding the object. In some examples, the sensing engine 106 can include hardware and/or a combination of hardware and program instructions sense and/or determine sonic parameters (e.g., a pitch that the object operates at, etc.) of an object.

The object identification engine 108 can include hardware and/or a combination of hardware and program instructions to identify the machine or object to be inspected. For example, the object identification engine 108 can request identification information regarding an object, receive identification information regarding the object, identify the object based on the identification information, retrieve operating parameter information regarding the object based on the identification information, and compare the operating parameter to the sensed information regarding the object. In some examples, the object identification engine can be an optical object identification engine that identifies the object to be inspected from optical information regarding the object. For example, the identification engine can identify the object to be inspected by reading a barcode on the object, taking a picture or video of the object, or by utilizing a Quick Response (QR) Code® on the object. In some examples, the object to be inspected can be determined via a schedule package and navigation to the object to be inspected can be provided automatically with no input from a user.

The communication engine 110 can include hardware and/or a combination of hardware and program instructions to communicate information from the sensing engine 106 and the object identification engine 108. For example, the communication engine 110 can communicate information regarding a comparison of the sensed information regarding an object and operating parameter information regarding the object. In some examples, the information can be gathered by the sensing engine 106 and/or the object identification engine 108 and can be communicated to, for example, a user. In some examples the communication engine can cause the information regarding a comparison of the sensed information and the operating parameter information to be cached for later retrieval.

The examples of engines shown in FIG. 1 is not limiting, as one or more engines described can be combined or can be a sub-engine of another engine. Further, the engines shown can be remote from one another in a distributed computing environment, cloud computing environment, etc.

Figure 2:
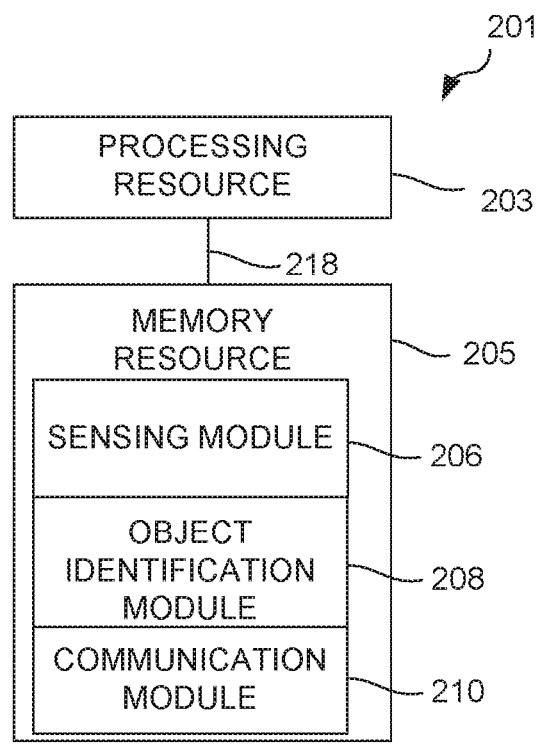
FIG. 2 illustrates an example of a computing device according to the present disclosure.

FIG. 2 illustrates a diagram of an example of a computing device 201 according to the present disclosure. The computing device 201 can utilize hardware, software (e.g., program instructions), firmware, and/or logic to perform a number of functions described herein. The computing device 201 can be any combination of hardware and program instructions configured to share information. The hardware can, for example, include a processing resource 203 and a memory resource 205 (e.g., computer or machine readable medium (CRM/MRM), database, etc.). A processing resource 203, as used herein, can include one or more processors capable of executing instructions stored by the memory resource 205. The processing resource 203 can be implemented in a single device or distributed across multiple devices. The program instructions (e.g., computer or machine readable instructions (CRI/MRI)) can include instructions stored on the memory resource 205 and executable by the processing resource 203 to perform a particular function, task and/or action (e.g. collect infrared temperature information from an object, collect sound information from an object, etc.).

The memory resource 205 can be a non-transitory machine readable medium, can include one or more memory components capable of storing instructions that can be executed by a processing resource 203, and can be integrated in a single device or distributed across multiple devices. Further, memory resource 205 can be fully or partially integrated in the same device as processing resource 203 or it can be separate but accessible to that device and processing resource 203. Thus, it is noted that the computing device 201 can be implemented on a participant device, on a server device, on a collection of server devices, and/or a combination of a participant (e.g., user/consumer endpoint device), and one or more server devices as part of a distributed computing environment, cloud computing environment, etc.

The memory resource 205 can be in communication with the processing resource 203 via a communication link (e.g., a path) 218. The communication link 218 can provide a wired and/or wireless connection between the processing resource 203 and the memory resource 205.

In the example of FIG. 2, the memory resource 205 includes a sensing module 206, an object identification module 208, and a communication module 210. As used herein a module can include hardware and software (e.g., program instructions), but includes at least program instructions that can be executed by a processing resource, for example, processing resource 203, to perform a particular task, function, and/or action. The plurality of modules can be combined or can be sub-modules of other modules. As shown in FIG. 2, the sensing module 206, the object identification module 208, and the communication module 210 can be individual modules located on a memory source. However, examples are not so limited and a plurality of modules can be located at separate and distinct memory resource location, (e.g., in a distributed computing environment, cloud computing environment, etc.).

Each of the plurality of modules can include instructions that when executed by the processing resource 203 can function as an engine such as the engines described in connection with FIG. 1. For example, the sensing module 206 can include instructions that when executed by the processing resource 203 can function as the sensing engine 106 shown in FIG. 1. The object identification module 208 can include instructions that when executed by the processing resource 203 can function as the object identification engine 108 shown in FIG. 1. The communication module 210 can include instructions that when executed by the processing resource 203 can function as the communication engine 110 shown in FIG. 1.

Embodiments are not limited to the example modules shown in FIG. 2 and in some cases a number of modules can operate together to function as a particular engine. Further, the engines and/or modules of FIGS. 1 and 2 can be located in a single system and/or computing device or reside in separate distinct locations in a distributed network, cloud computing, enterprise service environment (e.g., Software as a Service (SaaS)) environment), etc.

Figure 3:
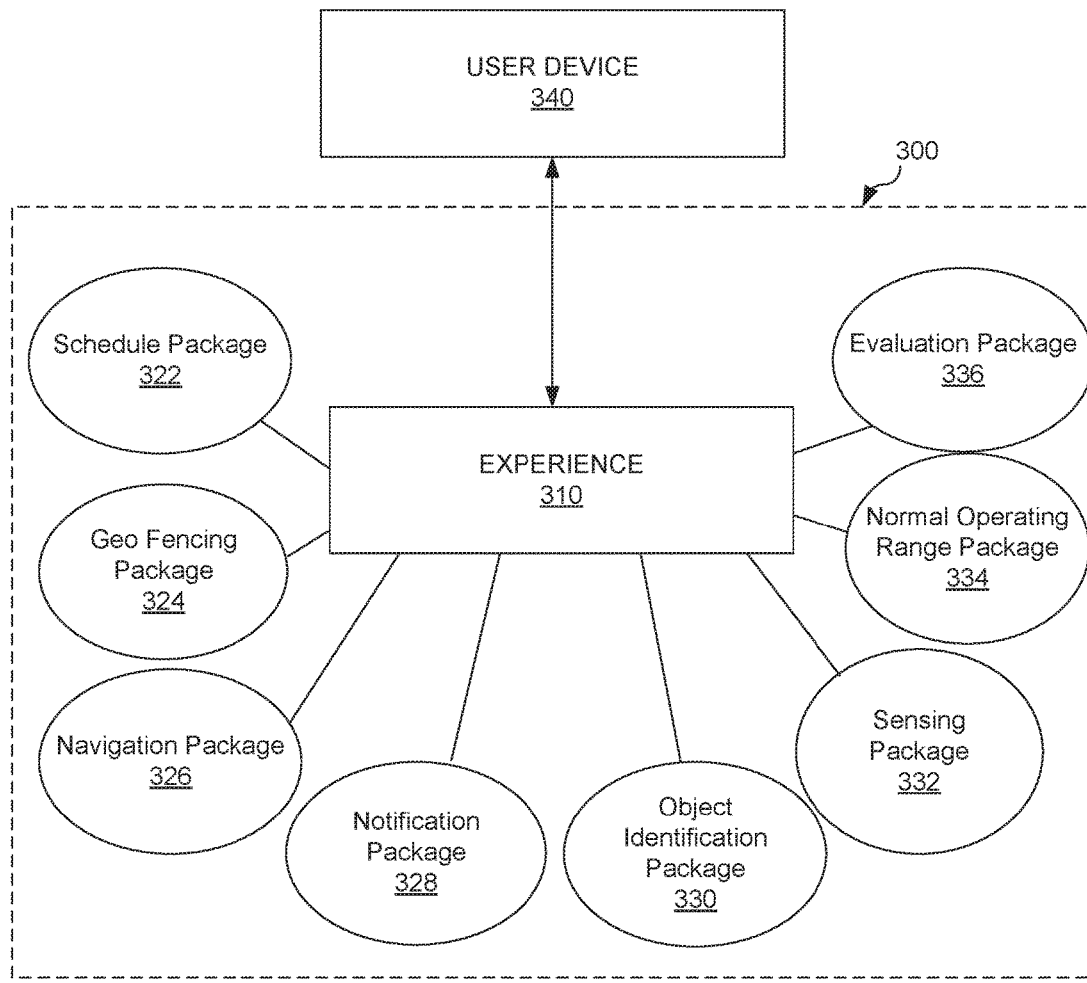
FIG. 3 is a schematic illustration of operation of an example of a platform for object identification and sensing according to the present disclosure.

FIG. 3 is a schematic illustration of operation of an example of a platform for object identification and sensing according to the present disclosure. In the example of FIG. 3, the CAP system 300 includes an experience 310 that can provide the user of the user device 340 with a seamless, integrated CAP experience. The experience 310 may call upon various packages 322, 324, 326, 328, 330, 332, 334, and 336 in a particular order or in particular conditions to provide the experience. As described herein, an experience can include executing instructions to assimilate packages in the right order in a pre-determined nature and/or in real time, based on learning technologies to provide information to a user in a seamless, integrated, and holistic manner. Further, the various packages, 322, 324, 326, 328, 330, 332, 334, 336 can include instructions executable by a processing resource 203 to capture individual elements of context in a given situation, as described herein.

Figure 4:
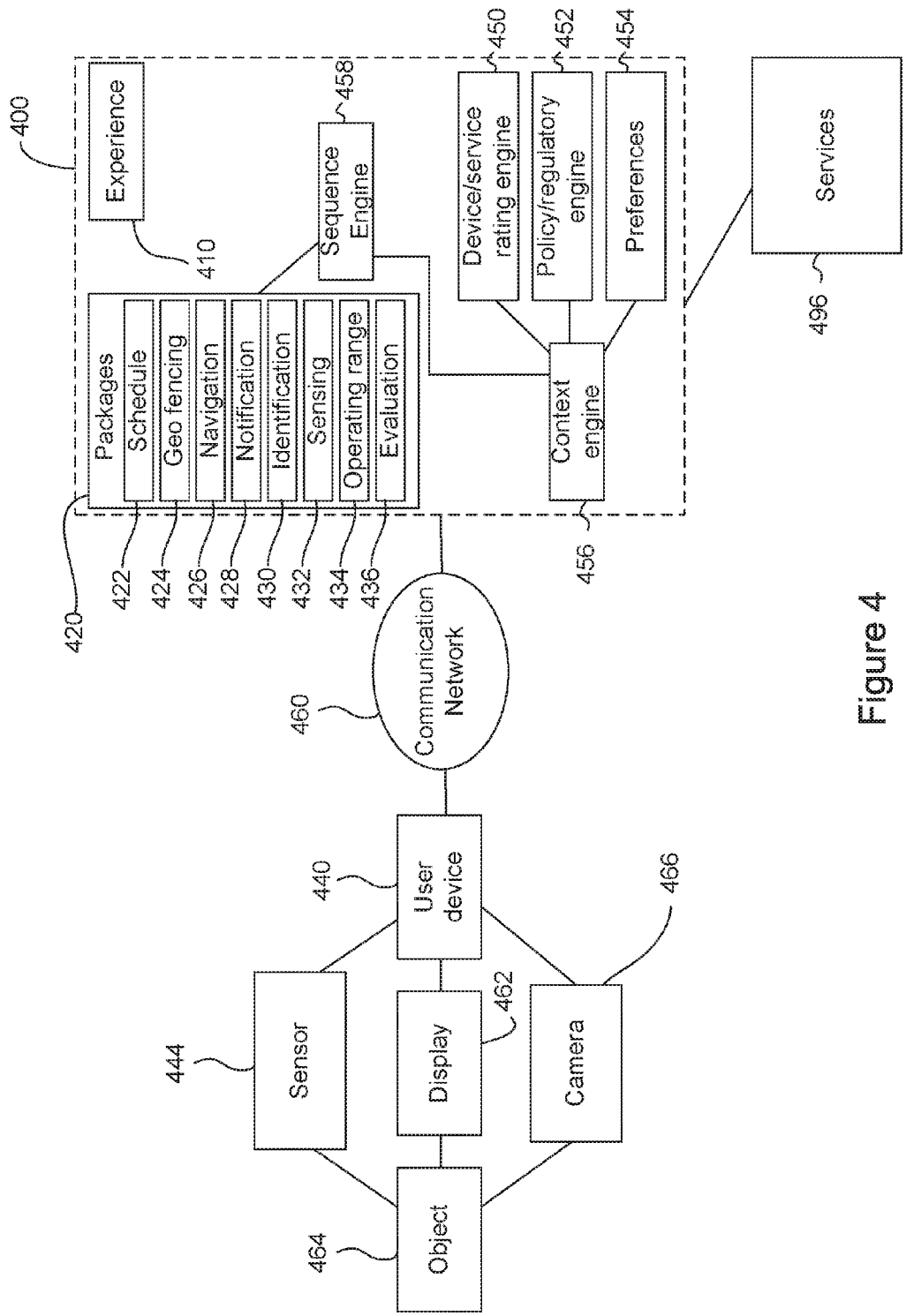
FIG. 4 illustrates an example of a platform for object identification and sensing according to the present disclosure.

In some examples, CAP 300 can check access rights associated with a device and/or user before executing packages (e.g., packages 420 illustrated in FIG. 4). For example, a user device can be provided with a plurality of permissions that correspond to various implementations of packages (e.g., packages 420 illustrated in FIG. 4). CAP 300 can check to see if these permissions authorize the user and/or device to, for example, receive data provided by the experience 310. In this regard, it can be ensured that the right data is sent to the right endpoint (e.g., user device), and that the receiver of the data (e.g., a user) is authorized to receive such data.

User device 340 can include a processor and memory configured to receive and communicate information. For example, a user device can include a computing device, sensor, and/or wearable device, (e.g., smartphone, smart watch, and/or smart glass, etc.). In some examples, the user device 340 can be a single, integrated device; however, examples are not so limited and the user device 340 can include a plurality of devices in communication. In addition, the user device can be portable. For example, the user device 340 can include a smartphone, laptop, smart watch, and/or smart glasses configured to be in communication with each other.

The experience 310 may call upon a schedule package 322 to determine a schedule for inspecting, for example, performing quality assurance checks, health checks, machine tests, etc., on an object or plurality of objects. In some examples, the schedule package 322 can retrieve information from a personal information manager (e.g., Microsoft Outlook®, Google® calendar, schedule within a maintenance management system, etc.) to provide the schedule. In addition, the schedule package can receive localization information (e.g., geo fencing information, etc.) from the personal information manager and/or localization information accessible from the user device 340 and/or the CAP system 300.

The experience 310 can call a geo fencing package 324 to detect and report geo fencing information (e.g., a location of an object). In some examples, the geo fencing package 324 can be called in response to input received by the CAP system 300 from the schedule package 322. In addition, the geo fencing package 324 can provide a notification to the user device 340 and/or the CAP system 300 when the user breaks the geo fence around an object. In some examples, breaking the geo fence around an object can cause the CAP system 300 to call additional packages (e.g., object identification package 330 and/or sensing package 332, etc.). As used herein, a "geo fence" is a virtual perimeter surrounding a real-world geographic area that is dynamically generated or constrained by a predefined set of boundaries. Examples of a geo fence can include a virtual perimeter surrounding a location, and object, or a zone.

The experience 310 can call a navigation package 326 to navigate the user to an object based on information provided by the schedule package 322 and the geo fencing package 324. For example, the CAP system 300 can, in response to information provided by the navigation package 326 and/or the geo fencing package 324, direct the user to the object. In some examples a map can be communicated to the user device 340 and displayed. In addition, step-by-step directions to the object can be provided to the user device 340.

The experience 310 can call a notification package 328 to notify a user that the geo fence boundary has been broken (e.g., to provide notification that the user has arrived at the object to be inspected). In some examples, the notification package 328 can provide an alert to the user device 340, for example, an auditory notification (e.g., a "beep," etc.) in response to the user device 340 coming into proximity with an object. In addition, the notification package 328 can cause the notification to be displayed on a smart glass device, smart watch, and/or wearable device (e.g., as a graphical exclamation point, check mark, "thumbs up," etc.).

An object identification package 330 can be called to identify the object when the user arrives at the object to be inspected. In some examples, in response to information received from the geo fencing package 324 and/or the notification package 328, the CAP system 300 can execute the object identification package 330. The object identification package 330 can communicate with the user device 340 to instruct the user device 340 to take a picture and/or video of the object and/or identifying characteristics of the object (e.g., serial number, bar code, Quick Response (QR) Code®, etc.) and can use the picture and/or video to determine the identity (e.g., make, model, etc.) of the object.

Upon identification of the object, a sensing package 332 can be called, for example, to collect information about the object. In some examples, the sensing package 332 can communicate with the user device 340 to cause the user device 340 to initiate a sensor or plurality of sensors in communication with the user device 340. For example, the sensor can be an infrared thermometer embedded in a smart glass device. In some examples, the infrared thermometer can focus infrared energy on to a detector which converts the energy to an electrical signal that can be displayed in units of temperature. Examples are not so limited however, and the sensor can be a sound sensor, an optical sensor, chemical sensor, and/or any other device capable of converting a physical quantity into a signal.

A normal operating range package 334 can be called to look up predefined operating parameters for an object (e.g., predefined operating temperature range, predefined sound spectrum, predefined chemical composition, etc.). The predefined operating parameters can be stored (e.g., cached on the CAP system 300), or can be retrieved from a remote database and/or accessed online (using, e.g., the Internet).

An evaluation package 336 can be called to determine whether the object to be inspected is within or outside its predefined operating range, for example, and to call the notification package 328 to generate a notification. In some examples, the evaluation package 336 can compare the information collected by the sensing package 332 to the information determined from the normal operating range package 334 to determine if the object is within or outside the predefined operating range for the object. As described herein, the notification can include an auditory alert, a visual alert, a physical alert, and/or any combination thereof. In some examples, the notification can overlay the display of a device (e.g., smart glass, smartphone, smart watch, and/or tablet) with augmented reality displaying whether the object is within or outside the predefined operating range.

FIG. 4 illustrates an example of a platform for object identification and sensing according to the present disclosure. As shown in FIG. 4, the CAP 400 may communicate with a user device 440 (e.g., analogous to user device 340 illustrated in FIG. 3) through a communication network 460. In addition, the display 462, camera 466, sensor 444, and/or user device 440 may communicate with the CAP 400 via the communications network 460, as discussed herein in connection with FIG. 2. In addition to the user device 440, display 462, and camera 466, and/or sensor 444, the experiences 410 and/or packages 420 may also access other devices not shown in FIG. 4. The experiences 410 and/or packages 420 can be analogous to the experiences and packages illustrated in FIG. 3. For example, additional computers associated with the user may also be accessed. In addition, the sensor 444, the display 462, and the camera 466 can be individual devices, or they be can be combined into a single device. Examples are not so limited; as will be appreciated by one skilled in the art, the sensor 444, the display 462, and the camera 466 can be combined in a number of ways in a number of different orientations without departing from the spirit of the present disclosure.

In the example of FIG. 4, the CAP system 400 may determine what package 420 to execute based on information provided by the context engine 456 and the sequence engine 458. For example, based on information provided to the CAP system 400 from the context engine 456 and the sequence engine 458, the experience 410 may call a schedule package 422 to provide information about what objects need to be inspected, what time the inspections need to be started or completed, and/or what order to inspect the objects in if there are a plurality of objects to be inspected. In some examples, the experience 410 can be initiated by voice and/or gestures received by the user device 440, the display 462, and/or the camera 466 which communicate with the CAP system 400 to call the schedule package 422, as described above. Alternately, in some examples, the schedule package 422 can be automatically called by the experience 410 at a particular time of the day, for example, 6:45 a.m., to start the user's work day. In addition, the schedule package 422 can be called upon determination by the experience 410 that an inspection has been completed, for example, to provide information about the next object 464 to be inspected. Thus, in various examples, the schedule package 422 can be called by the experience 410 without any input from the user. Similarly, the other packages 420, for example, geo fencing package 424, navigation package 426, notification package 428, identification package 430, infrared thermometer package 432, operating range package 434, and evaluation package 436 can be called by the experience 410 without any input from the user.

Execution of the schedule package 422 may return the location of the object 464 to be inspected, and may determine the next package to call via the sequence engine 458 and the context engine 456. In the example of FIG. 4, the location of the object 464 to be inspected, as returned by the schedule package 422, can be used as input for the geo fencing package 424. Upon receipt of the location information from the schedule package 422, the geo fencing package 424 may return geo fencing information regarding the object 464 to be inspected.

The CAP system 400, via the sequence engine 458 and the context engine 456 may call the navigation package 426 to navigate a user from their current location to the location of the object 464 to be inspected based on the location information from the schedule package 422 and/or the geo fence information from the geo fencing package 424. When a user arrives at the object 464 to be inspected, the experience 410 may call a notification package 428 to notify a user of arrival at the object 464 to be inspected. Further, in response to the notification package 428 determining that the user has reached the object 464, the experience 410 can provide a notification (e.g., an instruction) that a user can take pictures and/or video with the camera 466. The picture and/or video can be received at the CAP 400 via the communication network 460 and processed by the context engine 456 based on the sequence engine 458. In some examples, in response to the notification package 428 determining that the user has reached the object, the experience 410 can cause pictures and/or video of the object 464 to be taken without any input from the user, for example with a smart glass device. For example, the user device 440 can be a wearable camera device (e.g., smart glass, etc.) configured to take pictures and/or video in response to input received from the CAP system 400 (e.g., in response to input received via the notification package 428).

The experience 410 may call the sensing package 432 to communicate with the sensor 444 to determine information regarding an operating parameter associated with a particular object 464. In some examples, the information regarding the operating parameter for the particular object 464 can be infrared information. In some examples, the information regarding the operating parameter of the particular object 464 can be sound information. The information regarding an operating parameter of the particular object 464 can be returned to the CAP system 400 through the user device 440 or directly through the communication network 460. In some examples, the infrared thermometer can be a stand-alone instrument, or it can be integrated into the user device 440, or a smart glass device, for example.

The experience 410 may call the operating range package 434 according to the context engine 456, sequence engine 458, and the CAP 400 to determine a predefined operating temperature range of the object 464. The CAP 400, via the sequence engine 458, inputs the current object temperature as determined by the sensor 444 and infrared thermometer package 432 and a predefined operating temperature range in the evaluation package 436 to determine if the measured temperature is within or outside a predefined operating temperature range of the object 464. The experience 410 may call the notification package 428 to notify the user, for example via the user device 440 or display 462, whether the object 464 is within or outside a predefined operating temperature range. In some examples, the sensed information (e.g., infrared temperature information, sound information, etc.) and the predefined operating range (e.g., predefined temperature range) can be displayed simultaneously.

Figure 5:
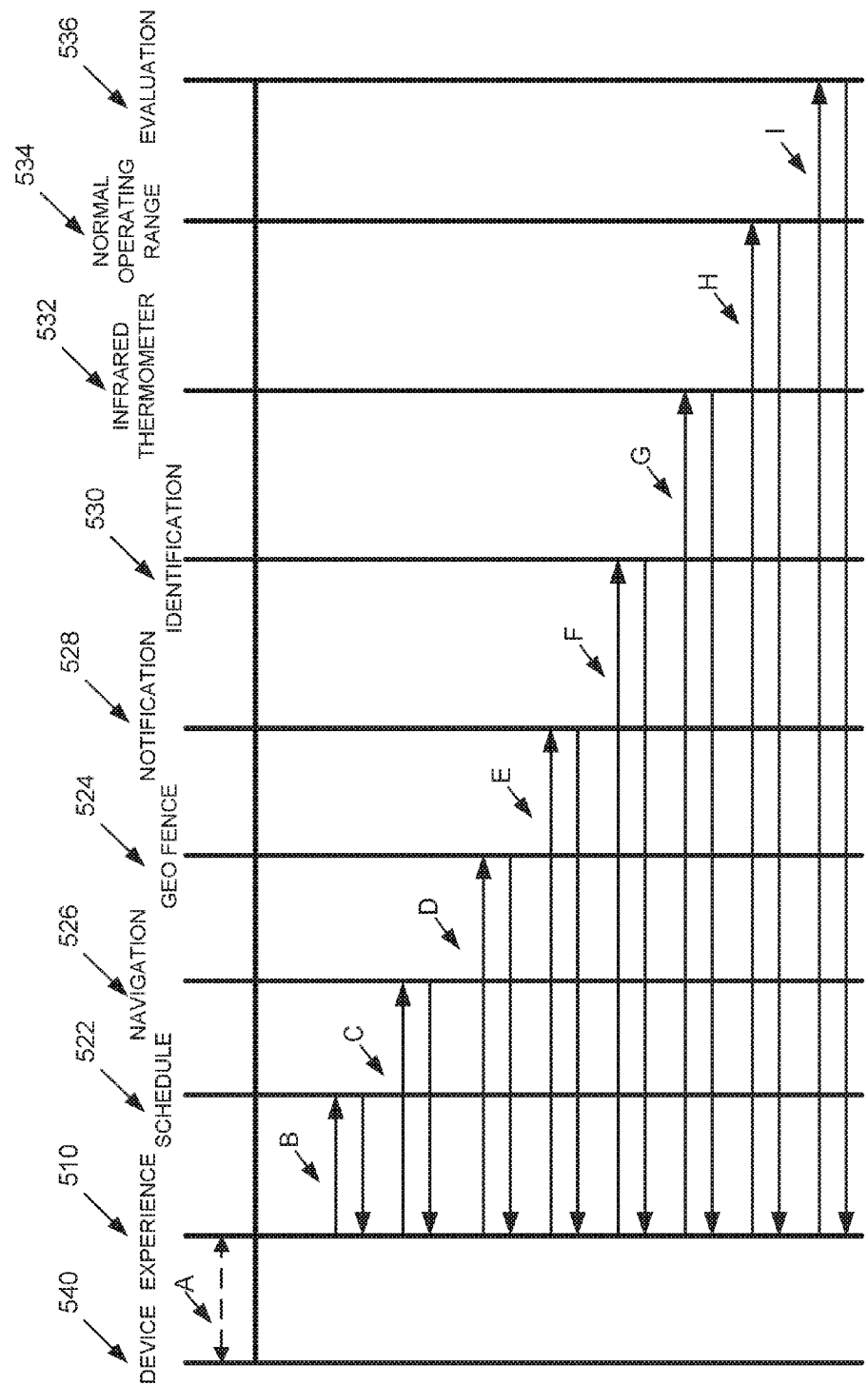
FIG. 5 illustrates a process flow of an example of an object identification and sensing according to the present disclosure.

FIG. 5 illustrates a process flow of an example of object identification and sensing according to the present disclosure. For purposes of understanding various applications of the disclosure, FIG. 5 is described for an implementation by a technician of an object identification infrared sensing experience 510. As indicated by the dotted line "A", a continuous or regular communication can be provided between the experience 510 and a user's device 540. The object identification infrared sensing experience may call a schedule package 522 to retrieve the location of the object to be inspected by the technician, which can be returned to the experience 510 as indicated by the arrows "B" in FIG. 5. The schedule package 522 can be called in response to input to the device 540, or it can be called with no input to the device, for example, at a set time during the day or in response to completion of a prior task.

The navigation package 526 can be called to take the location of the object to be inspected from the schedule package 522 and provide navigation from the technician's current location to the location of the object to be inspected, as indicated by arrows "C" in FIG. 5. Once the technician arrives at the object to be inspected, the geo fence package 524 can call the notification package 528 to notify the technician that the object to be inspected has been reached. In some examples, the object can be identified based on geo fencing information. In addition, the geo fence package 524 and/or the notification package 528 can communicate to the technician that optical information about the object needs to be gathered, as indicated by arrows "D" and "E," respectively, for example by the technician taking a picture or video of the object to be inspected. In some examples, the identification package 530 can be called in response to the technician taking the picture or video, as indicated by arrows "F" in FIG. 5. Examples are not so limited, however, and in some examples, the geo fence package 524 and/or the notification package 528 can cause the picture or video to be taken and call the identification package 530 without any input from the technician. The identification package 530 can identify the object to ensure the technician is at the correct object to be inspected. In addition, the identification package 530 can determine other information about the object to be inspected. For example, the identification package 530 can determine a make, model, and/or other identifying characteristics of the object.

As indicated by arrows "G" in FIG. 5, the infrared thermometer package 532 can be called to determine the temperature of the object via an infrared thermometer. The infrared thermometer (444 in FIG. 4) can be a standalone device, a wearable device, or it can be incorporated into such a device, (e.g., smart glasses, etc.).

At 534, the normal operating range package can be called to look up the thermal operating range of the object to be inspected, as indicated by arrows "H" in FIG. 5. In operation, the normal operating range package can have temperature operating range data stored or it can access the information from a database or website via, for example, the Internet.

As indicated by arrows "I" in FIG. 5, at 536 an evaluation package 536 can be called to compare the temperature as read by the sensor (444 in FIG. 4) to a predefined operating range for the object to be inspected.

Figure 6:
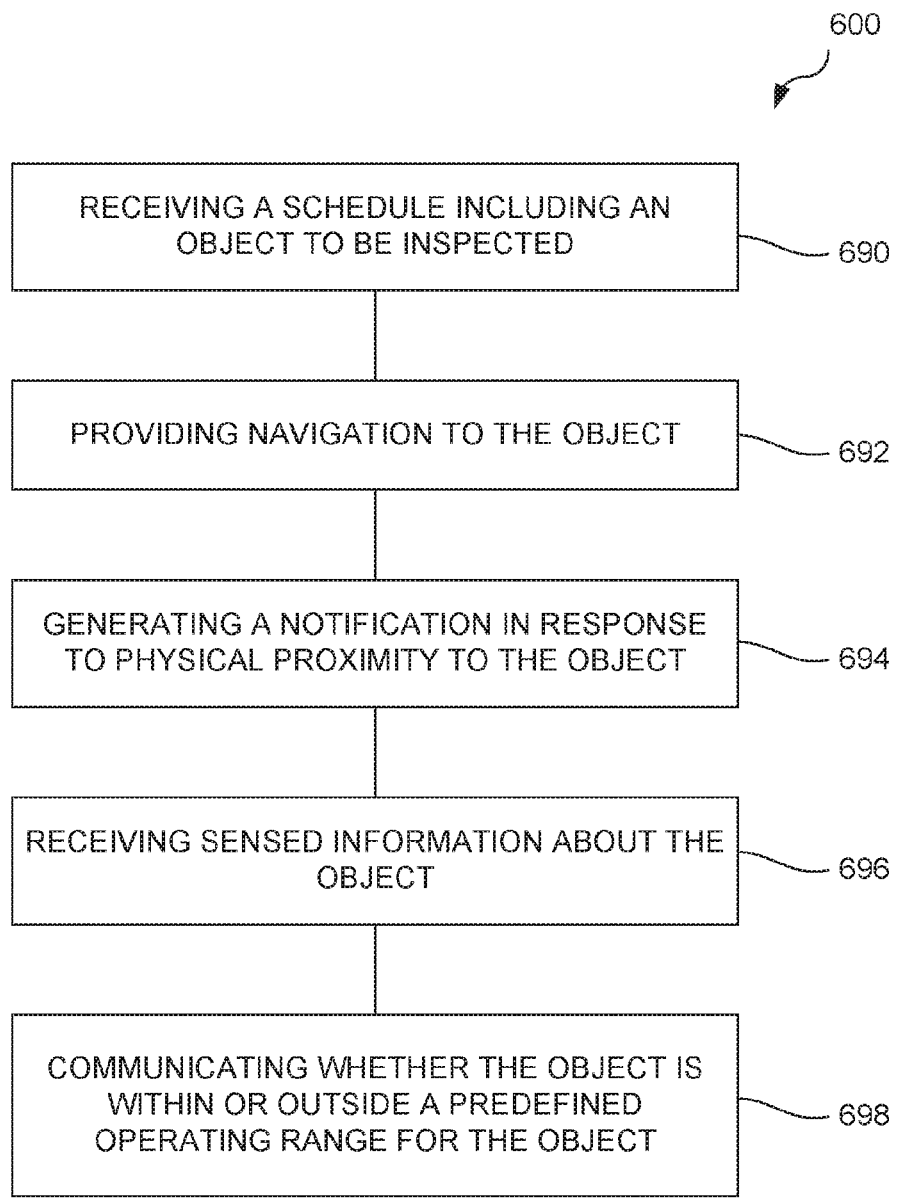
FIG. 6 illustrates a flow chart of an example of a method for object identification and sensing according to the present disclosure.

FIG. 6 illustrates a flow chart of an example of a method for object identification and sensing according to the present disclosure. As shown at 690, in various examples, the method 600 can include receiving a schedule including an object to be inspected. The schedule can be received and/or updated at scheduled times (e.g., once daily at 6:00 am, every three hours, etc.), and/or continuously updated throughout the day and/or night. In addition, the schedule can be received automatically, and/or the schedule can be received in response to an input or action from a user or machine.

The method 600 can include providing navigation to the object, as shown at 692. For example, navigation can include receiving step-by-step directions to locate the object, and/or receiving a map showing the location of the object in relation to the current location of the user. In addition, the navigation can be received in response to an input or action from a user or machine, or navigation can be received at the direction of the schedule.

As shown at 694, the method 600 can include generating a notification in response to physical proximity to the object. The notification received can be auditory and/or visual (e.g., a "beep" or some other noise and/or a message reading "object located," "destination reached," etc.). In addition, the notification can be received in response to breaking a geo fence boundary or in response to global positioning satellite information.

The method 600 can include receiving sensed information about the object, as shown at 696. In some examples, the sensed information can be received in response to an input or action from a user or machine (e.g., a user can initiate an infrared temperature apparatus to determine the temperature of an object). However, examples are not so limited, and the sensed information can be received automatically with no need for input from a user or machine.

As shown at 698, the method 600 can include communicating whether the object is within or outside a predefined operating range for the object. In some examples, whether or not the object is within or outside a predefined operating temperature range can be received automatically with no need for user or machine input. In some examples, communicating whether or not the object is within or outside a predefined operating range can include forwarding whether or not the object is within or outside a predefined temperature range via a communication network.

Figure 7:
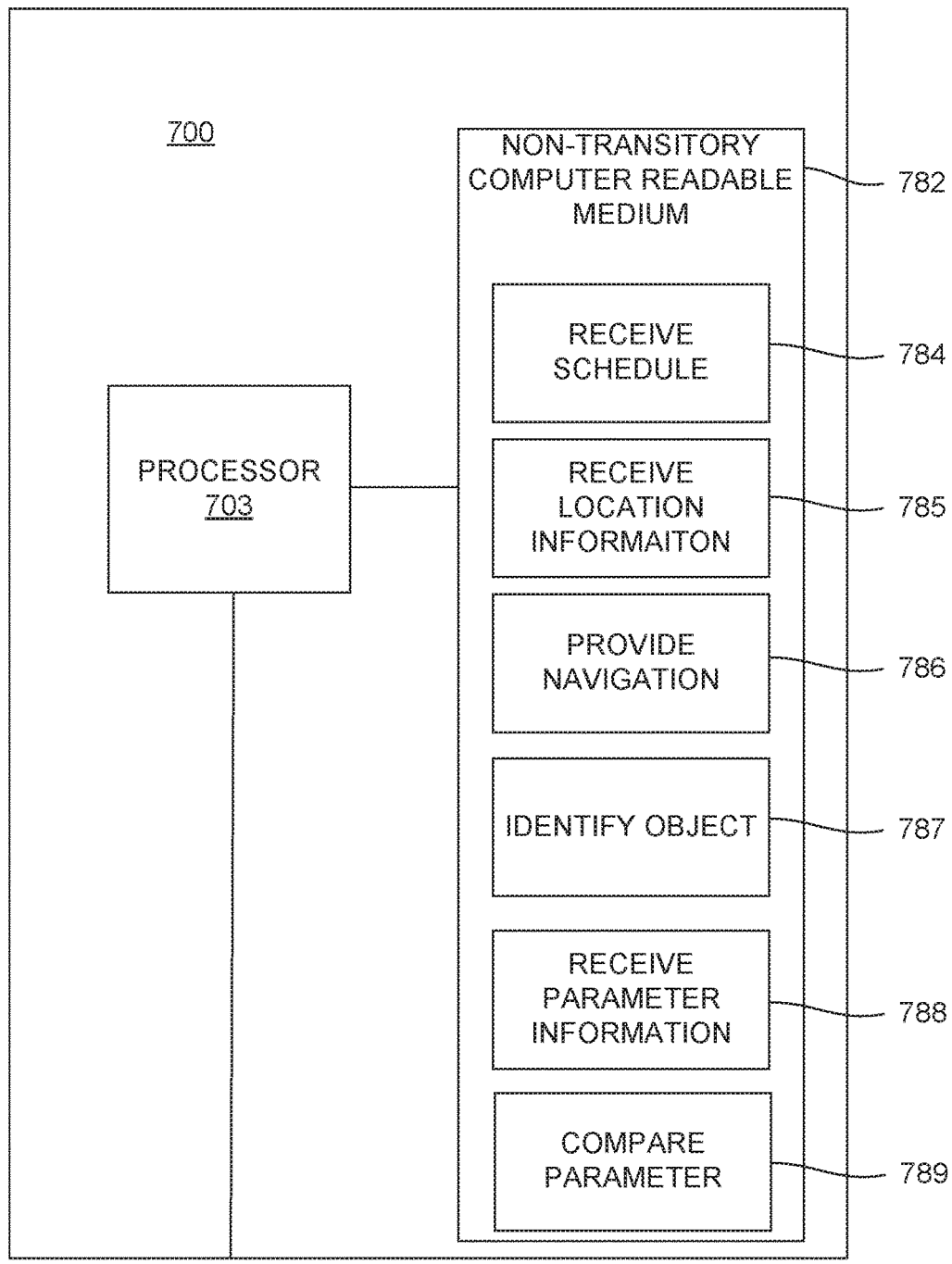
FIG. 7 illustrates an example system including a processor and non-transitory computer readable medium according to the present disclosure.

FIG. 7 illustrates an example system 700 including a processor 703 and non-transitory computer readable medium 782 according to the present disclosure. For example, the system 700 can be an implementation of an example system such as system 100 of FIG. 1.

The processor 703 can be configured to execute instructions stored on the non-transitory computer readable medium 782. For example, the non-transitory computer readable medium 782 can be any type of volatile or non-volatile memory or storage, such as random access memory (RAM), flash memory, or a hard disk. When executed, the instructions can cause the processor 703 to perform a method of object identification and sensing, such as the method described with respect to FIG. 6.

The example medium 782 can store instructions executable by the processor 703 to perform object identification and sensing. For example, the processor 703 can execute instructions 784 to receive a schedule for inspecting a plurality of objects. In addition, the processor 703 can execute instructions 784 to perform block 690 of the method of FIG. 6.

The example medium 782 can further store instructions 785. The instructions 785 can be executable to receive location information regarding an inspector and to receive location information regarding each of a plurality of objects. In some examples, identifying the object can be based on navigation and/or geo fencing information relating to the object.

The example medium 782 can further store instructions 786. The instructions 786 can be executable to provide navigation to each of a plurality of objects based on the schedule, the location information regarding the inspector, and the location information regarding each of the plurality of objects. In some examples, navigation to each of a plurality of objects can be presented step-by-step. In addition, the processor 703 can execute instructions 786 to perform block 692 of the method of FIG. 6.

The example medium 782 can further store instructions 787. The instructions 787 can be executable to receive identification information about a particular object of the plurality of objects and identify the particular object based on the received identification information. In some examples, the object can be identified based on navigation, geo fencing, QR Code®, bar code, serial number, pictures, and/or video.

The example medium 782 can further store instructions 788. The instructions 788 can be executable to receive information regarding an operating parameter about a particular object. In addition, the processor 703 can execute instructions 788 to perform block 696 of the method of FIG. 6.

The example medium 782 can further store instructions 789. The instructions 789 can be executable to determine if the operating parameter of a particular object is within a predefined operating range based on the identity of the particular object and the received operating parameter information, and communicate whether the operating parameter information is within or outside the predefined operating range for the object. In addition, the processor 703 can execute instructions 789 to perform block 698 of the method of FIG. 6.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As used herein, "logic" is an alternative or additional processing resource to perform a particular action and/or function, etc., described herein, which includes hardware, (e.g., various forms of transistor logic, application specific integrated circuits (ASICs), etc.), as opposed to computer executable instructions, (e.g., software, firmware, etc.), stored in memory and executable by a processor.

What is claimed:

1. A non-transitory computer readable medium storing instructions executable by a processing resource to:
   receive a schedule for inspecting a plurality of objects;
   receive location information regarding each of the plurality of objects;
   provide navigation to each of the plurality of objects based on the schedule and the location information regarding each of the plurality of objects;
   receive identification information about a particular object of the plurality of objects;
   identify the particular object based on the received identification information;
   receive information regarding an operating parameter about the particular object;
   determine if the operating parameter of the particular object is within a predefined operating range based on the identity of the particular object and the received operating parameter information;
   communicate whether the operating parameter information is within or outside the predefined operating range for the object.

2. The medium of claim 1, wherein the information regarding the operating parameter of the particular object is infrared information.

3. The medium of claim 2, including instructions to communicate a predefined temperature range for the object to be inspected.

4. The medium of claim 2, wherein the instructions are executable to display the sensed temperature information and a predefined operating temperature range for the object simultaneously.

5. The medium of claim 1, wherein the information regarding the operating parameter of the particular object is sound information.

6. The medium of claim 1, wherein navigation to each of the plurality of objects is presented step-by-step.

7. The medium of claim 1, including instructions to identify the object based on geo fencing information.

8. The medium of claim 1, wherein the instructions are executable to identify the object based on a navigation package.

9. The medium of claim 1, further including instructions to:
   determine the object to be inspected via a schedule package;
   navigate to the object to be inspected automatically; and
   identify the object from optical information regarding the object.

10. A method for context based object identification comprising:
    receiving a schedule for inspecting a plurality of objects;
    receiving location information regarding each of the plurality of objects;
    providing navigation to each of the plurality of objects based on the schedule and the location information regarding each of the plurality of objects;
    receiving identification information about a particular object of the plurality of objects;
    identifying the particular object based on the received identification information;
    receiving information regarding an operating parameter about the particular object;
    determining if the operating parameter of the particular object is within a predefined operating range based on the identity of the particular object and the received operating parameter information; and
    communicating whether the operating parameter information is within or outside a predefined operating range for the object.

11. The method of 10, further comprising identifying the object based on optical information relating to the object.

12. The method of 10, further comprising receiving predefined operating range information about the object for comparison to the sensed information.

13. The method of claim 10, wherein communicating whether or not the object is within or outside a predefined operating range comprises forwarding whether or not the object is within or outside a predefined temperature range via a communication network.

14. A system, comprising:
    at least one processor; and
    a memory storing instructions that, when executed by the at least one processor, cause the system to perform:
    receive a schedule for inspecting a plurality of objects;
    receive location information regarding each of the plurality of objects;
    provide navigation to each of the plurality of objects based on the schedule and the location information regarding each of the plurality of objects;
    receive identification information about a particular object of the plurality of objects;
    identify the particular object based on the received identification information;
    receive information regarding an operating parameter about the particular object;
    determine if the operating parameter of the particular object is within a predefined operating range based on the identity of the particular object and the received operating parameter information; and
    communicate whether the operating parameter information is within or outside the predefined operating range for the object.

15. The system of claim 14, wherein the system causes the information regarding the comparison of the sensed information and the operating parameter information to be cached for later retrieval.

* * * * *